United States Patent
Choi et al.

(10) Patent No.: US 10,533,524 B2
(45) Date of Patent: *Jan. 14, 2020

(54) APPARATUS AND METHOD FOR PURGING FUEL VAPOR

(71) Applicant: HYUNDAI MOTOR COMPANY, Seoul (KR)

(72) Inventors: Choo Saeng Choi, Seongnam-si (KR); Dong Hee Han, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 231 days.

This patent is subject to a terminal disclaimer.

(21) Appl. No.: 15/378,630

(22) Filed: Dec. 14, 2016

(65) Prior Publication Data

US 2018/0080416 A1    Mar. 22, 2018

(30) Foreign Application Priority Data

Sep. 19, 2016  (KR) .................. 10-2016-0119249

(51) Int. Cl.
*F02M 25/08* (2006.01)
*F02D 41/00* (2006.01)

(52) U.S. Cl.
CPC ....... *F02M 25/0836* (2013.01); *F02D 41/004* (2013.01); *F02M 25/0854* (2013.01)

(58) Field of Classification Search
CPC . F02D 41/0032; F02D 41/0007; F02D 41/004
See application file for complete search history.

(56) References Cited

U.S. PATENT DOCUMENTS

| | | | |
|---|---|---|---|
| 2005/0011498 A1 | 1/2005 | Yoshiki et al. | |
| 2013/0269660 A1* | 10/2013 | Peters | F02M 25/08 123/520 |
| 2014/0116399 A1 | 5/2014 | Ulrey et al. | |
| 2014/0251284 A1 | 9/2014 | Plymale et al. | |
| 2015/0059710 A1 | 3/2015 | Michikawauchi | |
| 2015/0120108 A1* | 4/2015 | Dudar | F02M 25/089 701/22 |

(Continued)

FOREIGN PATENT DOCUMENTS

| | | |
|---|---|---|
| JP | S63-134161 U | 9/1988 |
| JP | 2006-348901 A | 12/2006 |

(Continued)

OTHER PUBLICATIONS

Korean Notice of Allowance issued in corresponding Korean Patent Application No. 10-2016-0119249, dated Jul. 23, 2018, with English Translation.

*Primary Examiner* — Ngoc T Nguyen
(74) *Attorney, Agent, or Firm* — Morgan, Lewis & Bockius LLP

(57) ABSTRACT

An apparatus for purging fuel vapor includes: a turbocharger; a recirculation valve; a canister connected with a fuel tank through a vapor line and collecting fuel vapor of fuel stored in the fuel tank; a purge control solenoid valve installed in a main purge line connected with the canister and selectively blocking the fuel vapor collected in the canister; a first check valve; a second check valve; and a differential pressure creating valve installed in the intake line at the upstream portion of the compressor, and creating negative pressure.

5 Claims, 3 Drawing Sheets

(56) References Cited

U.S. PATENT DOCUMENTS

| | | | |
|---|---|---|---|
| 2015/0198122 A1* | 7/2015 | Vigild | F02M 25/0836 |
| | | | 123/520 |
| 2015/0292428 A1* | 10/2015 | Hakeem | F02D 41/144 |
| | | | 701/104 |
| 2016/0230682 A1 | 8/2016 | Hagner et al. | |
| 2017/0045019 A1* | 2/2017 | Dudar | F02M 25/0836 |
| 2017/0082038 A1* | 3/2017 | Dudar | F02M 25/0836 |
| 2017/0268447 A1* | 9/2017 | Surnilla | F02D 41/1458 |
| 2018/0135565 A1* | 5/2018 | Choi | F02D 41/0032 |

FOREIGN PATENT DOCUMENTS

| | | |
|---|---|---|
| JP | 2012-122430 A | 6/2012 |
| JP | 2013-245568 A | 12/2013 |
| WO | 2013/150638 A1 | 10/2013 |

* cited by examiner

APPARATUS AND METHOD FOR PURGING FUEL VAPOR

CROSS-REFERENCE TO RELATED APPLICATION

This application claims the benefit of priority to Korean Patent Application No. 10-2016-0119249, filed in the Korean Intellectual Property Office on Sep. 19, 2016, the entire content of which is incorporated herein by reference.

TECHNICAL FIELD

The present disclosure relates to an apparatus and a method for purging fuel vapor, and more particularly, to an apparatus and a method for purging fuel vapor for a vehicle, which are capable of recirculating fuel vapor generated in a fuel tank to a surge tank and a upstream portion of a compressor of a turbocharger.

BACKGROUND

In the automobile industry, there has been extensive research conducted into improving emissions. In particular, in some countries, regulations are in force to reduce the total amount of vaporized fuel gas to 0.5 g/day or less in order to minimize emission of hydrocarbon (HC) included in the vaporized gas of gasoline fuel, and the total amount of vaporized fuel gas will be limited to 0.054 g/day or less.

In general, to meet the regulations, recently, the automobile industry minimizes the occurrence of the vaporized fuel gas, which penetrates a fuel tank, by improving a material of the fuel tank and optimizing connection structures, and on the other hand, the automobile industry adopts a vaporized fuel gas recirculation system in which a canister is applied to a fuel supply device.

Here, the canister contains an absorbent material which may absorb the vaporized fuel gas from the fuel tank that stores volatile fuel, and the canister is connected with the fuel tank and collects the vaporized fuel gas in order to prevent the vaporized fuel gas, which is evaporated from a float chamber of a vaporizer and the fuel tank, from being discharged into the atmosphere.

The vaporized fuel gas, which is collected in the canister as described above, is introduced back into an engine by a purge control solenoid valve (PCSV) controlled by an engine control unit (hereinafter, referred to as an 'ECU'), and then the vaporized fuel gas is combusted, such that the vaporized fuel gas is recirculated.

In a case in which an apparatus for purging the fuel vapor in the related art is used together with an exhaust gas recirculation (EGR) apparatus and a turbocharger, it is difficult to accurately control an EGR ratio, and it is difficult to purge the fuel vapor when intake boosting is carried out by the turbocharger.

Therefore, there is a need for research on an apparatus for purging fuel vapor which is capable of accurately controlling the EGR ratio and purging the fuel vapor even though the intake boosting is carried out by the turbocharger.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for purging fuel vapor, which are capable of accurately controlling an EGR ratio and purging the fuel vapor generated in a fuel tank even though intake boosting is carried out by the turbocharger.

An exemplary embodiment of the present disclosure provides an apparatus for purging fuel vapor, the apparatus including: a turbocharger which includes a turbine installed in an exhaust line through which exhaust gas discharged from an engine flows, and a compressor which rotates in conjunction with the turbine and compresses intake gas to be supplied into the engine; a recirculation valve which is installed in a recirculation line that branches off from the exhaust line at a downstream portion of the turbine and merges into the intake line at a upstream portion of the compressor; a canister which is connected with a fuel tank through a vapor line and collects fuel vapor of fuel stored in the fuel tank; a purge control solenoid valve which is installed in a main purge line connected with the canister and selectively blocks the fuel vapor collected in the canister; a first check valve which is installed in a first purge line that branches off from the main purge line and merges into the intake line at the downstream portion of a throttle valve, and prevents the fuel vapor flowing along the first purge line from flowing reversely; a second check valve which is installed in a second purge line that branches off from the main purge line and merges into the intake line at the upstream portion of the compressor, and prevents the fuel vapor flowing along the second purge line from flowing reversely; and a differential pressure creating valve which is installed in the intake line at the upstream portion of the compressor, and creates negative pressure.

The differential pressure creating valve may create negative pressure in order to suck fuel vapor flowing through the second purge line.

In an operation region in which the turbocharger does not operate, the differential pressure creating valve may be opened.

In an operation region in which the turbocharger operates, the differential pressure creating valve may be closed by a predetermined amount.

The differential pressure creating valve may be closed at a maximum closing degree or less.

The maximum closing degree may be a closing degree of the differential pressure creating valve for maintaining output of the engine which is determined based on required torque for a driver.

The purge control solenoid valve may be controlled based on a collected amount of hydrocarbon in the canister.

The apparatus may further include a recirculation valve installed in a recirculation line that branches off from the exhaust line at a downstream portion of the turbine and merges into the intake line at a upstream portion of the compressor.

Another exemplary embodiment of the present disclosure provides a method of purging fuel vapor, by using an apparatus for purging fuel vapor, which includes an engine, a turbocharger, and an exhaust gas recirculation system, the method including: determining, by a controller, whether an operation region is an operation region in which the turbocharger operates; adjusting, by the controller, an opening degree of a differential pressure creating valve installed in an intake line at a upstream portion of a compressor of the turbocharger based on the operation region in which the turbocharger operates; calculating, by the controller, a collected amount of hydrocarbon in a canister that collects fuel vapor generated in a fuel tank; and controlling, by the controller, a purge control solenoid valve based on the collected amount of hydrocarbon.

The differential pressure creating valve may be opened in an operation region in which the turbocharger does not operate.

The adjusting of the opening degree may include closing the differential pressure creating valve by a predetermined amount in an operation region in which the turbocharger operates.

The differential pressure creating valve may be closed at a maximum closing degree or less.

The maximum closing degree may be a closing degree of the differential pressure creating valve for maintaining output of the engine which is determined based on required torque for a driver.

According to the apparatus and the method for purging fuel vapor according to the exemplary embodiment of the present disclosure, it is possible to increase the supply amount of EGR gas and accurately control the EGR ratio in a region in which intake boosting is not carried out by the turbocharger, by using the differential pressure creating valve installed in the intake line at the upstream portion of the compressor of the turbocharger.

In addition, it is possible to increase the amount of purged fuel vapor in a region in which the intake boosting is carried out by the turbocharger, by using the differential pressure creating valve.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION OF THE EMBODIMENTS

Figure 1:
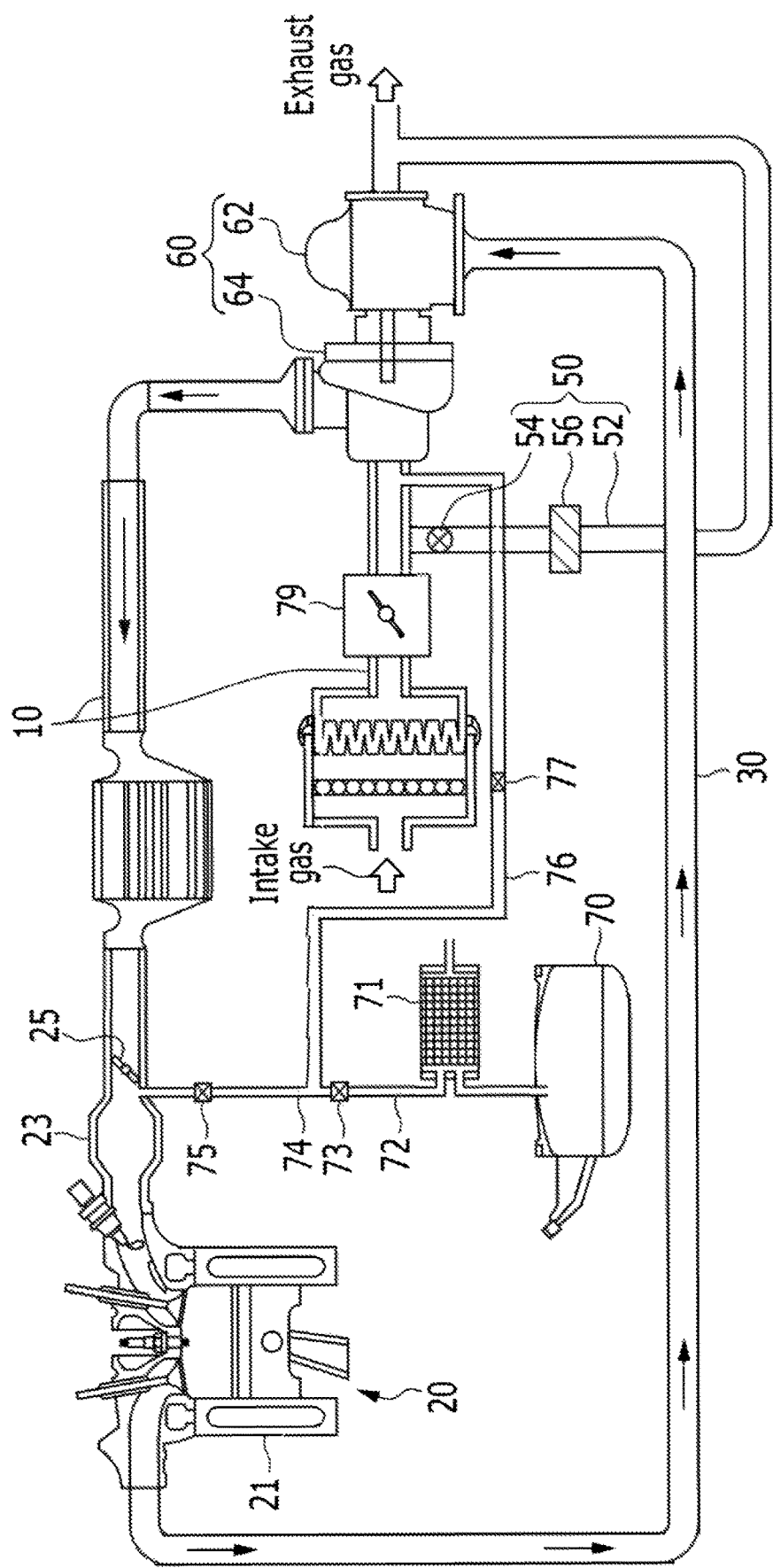
FIG. 1 is a conceptual view illustrating a configuration of an apparatus for purging fuel vapor according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

In addition, the size and thickness of each component illustrated in the drawings are arbitrarily shown for understanding and ease of description, but the present invention is not limited thereto. Thicknesses of several portions and regions are enlarged for clear expressions.

Hereinafter, an apparatus for purging fuel vapor according to the exemplary embodiment of the present disclosure will be described in detail with reference to the accompanying drawings.

Figure 2:
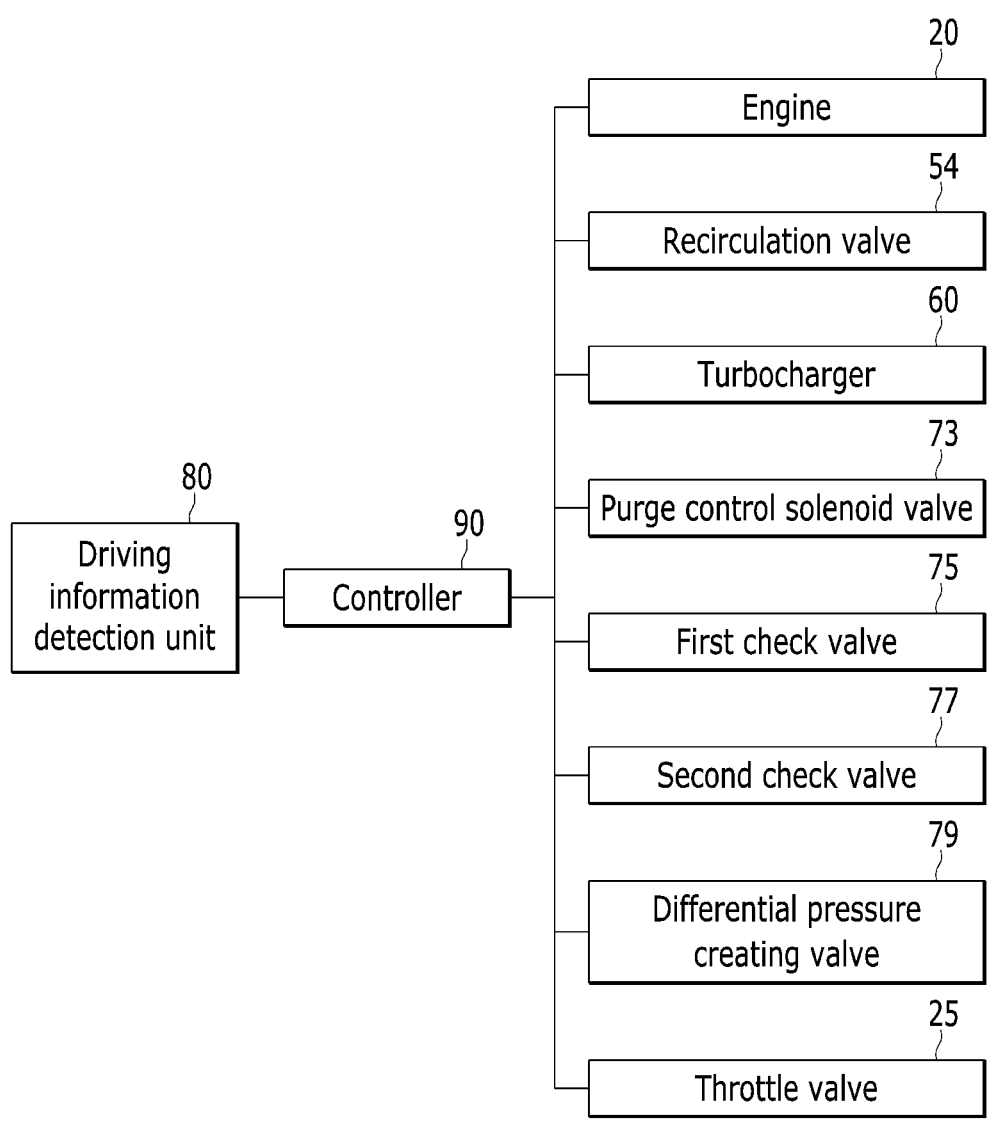
FIG. 2 is a block diagram illustrating the configuration of the apparatus for purging fuel vapor according to the exemplary embodiment of the present disclosure.

FIG. 1 is a conceptual view illustrating a configuration of the apparatus for purging fuel vapor according to an exemplary embodiment of the present disclosure. FIG. 2 is a block diagram illustrating the configuration of the apparatus for purging fuel vapor according to the present exemplary embodiment.

As illustrated in FIGS. 1 and 2, the apparatus for purging fuel vapor according to the present exemplary embodiment includes an engine 20, a turbocharger 60, and an exhaust gas recirculation (EGR) system.

The engine 20 includes a plurality of cylinders 21 that generates driving power by combusting fuel. The engine 20 is provided with an intake line 10 through which intake gas to be supplied into the cylinder 21 flows, and an exhaust line 30 through which exhaust gas discharged from the cylinder 21 flows.

The air introduced through the intake line 10 is supplied into the cylinder 21 through an intake manifold 23. A throttle valve 25, which adjusts the amount of air to be supplied into the cylinder 21, is mounted in the intake line 10 at a upstream portion of the intake manifold 23.

The turbocharger 60 is provided between the intake line 10 and the exhaust line 30 and operated by exhaust gas discharged from the cylinder 21 so as to compress intake gas (outside air+recirculation gas) and supply the compressed intake gas into the cylinder 21. The turbocharger 60 includes a turbine 62 which is provided in the exhaust line 30 and rotates by exhaust gas discharged from the cylinder 21, and a compressor 64 which rotates in conjunction with the rotation of the turbine 62 and compresses intake gas.

The exhaust gas recirculation system 50 is an apparatus which supplies a part of the exhaust gas discharged from the engine 20 back into the engine 20. The exhaust gas recirculation system 50 includes a recirculation line 52 which branches off from the exhaust line 30 at a downstream portion (downstream) of the turbine 62 of the turbocharger 60 and merges into the intake line 10 at a upstream portion (upstream) of the compressor 64 of the turbocharger 60, an exhaust gas recirculation cooler 56 (EGR cooler) which is installed in the recirculation line 52, and a recirculation valve 54 which is installed in the recirculation line 52.

The amount of recirculation gas, which is a part of exhaust gas that is discharged from the engine 20 and will be supplied back into the engine 20, is adjusted by an opening degree of the recirculation valve 54. An operation of the recirculation valve 54 is controlled by control signals from a controller 90 to be described below.

Volatile fuel to be supplied into the cylinder 21 is stored in a fuel tank 70, and a canister 71 is connected with the fuel tank 70 through a vapor line and contains an absorbent material that may absorb fuel vapor generated in the fuel tank 70.

A purge control solenoid valve (PCSV) 73 is installed in a first purge line 74 connected with the canister 71 and selectively blocks the fuel vapor collected in the canister 71.

A main purge line 72 is divided into the first purge line 74 and a second purge line 76.

The first purge line 74 branches off from the main purge line 72 and merges into the intake line 10 at the downstream portion of the throttle valve 25. A first check valve 75 is installed in the first purge line 74, and the first check valve 75 prevents the fuel vapor flowing along the first purge line 74 from flowing reversely. The first check valve 75 prevents the air from flowing reversely in a boosting region.

That is, because of the first check valve 75, the fuel vapor, which flows along the first purge line 74, flows from the purge control solenoid valve 73 to the intake manifold 23, but does not flow in the reverse direction.

The second purge line 76 branches off from the main purge line 72, and merges into the intake line 10 at the upstream portion of the compressor 64. A second check valve 77 is installed in the second purge line 76, and the second check valve 77 prevents the fuel vapor flowing along the second purge line 76 from flowing reversely. The second check valve 77 prevents fresh air from being introduced from the second purge line 76 if the region is not the boosting region.

That is, because of the second check valve 77, the fuel vapor, which flows along the second purge line 76, flows from the purge control solenoid valve 73 to the intake line at the upstream portion of the compressor 64, but does not flow in the reverse direction.

A differential pressure creating valve 79 is installed in the intake line 10 at the upstream portion of the compressor 64. The differential pressure creating valve 79 is opened in a normal state, and closed to a degree to create negative pressure at the upstream portion of the compressor 64.

That is, when the differential pressure creating valve 79 is closed to a degree, a flow velocity of the intake gas flowing to the compressor 64 is increased, and intake pressure at the upstream portion of the compressor 64 is decreased, thereby forming negative pressure. This uses Bernoulli's theorem.

A closing degree of the differential pressure creating valve 79 is determined based on a required amount of intake gas of the engine 20 and a flow velocity of the intake gas according to an opening degree of the differential pressure creating valve 79. The required amount of intake gas of the engine 20 may be detected by a driving information detector 80. The driving information detector 80 detects driving information including required torque and a required velocity for a driver, a speed of the engine 20, and a load of the engine 20, and the driving information is transmitted to the controller 90.

In this case, the required torque and the required velocity for a driver may be detected by an acceleration pedal sensor (APS) provided in a vehicle, the torque of the engine 20 may be detected by a torque sensor, and the speed of the engine 20 may be detected by a speed sensor.

The controller 90 may be an engine control unit (ECU) provided in the vehicle. The controller 90 controls operations of the engine 20, the turbocharger 60, the recirculation valve 54, the canister 71, the purge control solenoid valve 73, and the differential pressure creating valve 79.

To this end, the controller 90 may be configured by one or more processors which are operated by a preset program, and the preset program is configured to perform respective steps of a method of purging fuel vapor according to another exemplary embodiment of the present invention.

The controller 90 calculates the required amount of intake gas of the engine 20 based on the driving information, and adjusts the closing degree of the differential pressure creating valve 79 based on the required amount of intake gas of the engine 20 and the amount of the intake air according to the opening degree of the differential pressure creating valve 79. In this case, the amount of the intake air according to the opening degree of the differential pressure creating valve 79 may be saved in the form of map data in advance in the controller 90.

The controller 90 may refer to a hardware device including a memory and a processor configured to execute one or more steps interpreted as an algorithm structure. The memory stores algorithm steps, and the processor specifically executes the algorithm steps to perform one or more of the described processes.

Further, the disclosed method may be implemented by a non-transient computer-readable medium on a computer-readable means including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages.

Hereinafter, a method of purging fuel vapor according to an exemplary embodiment of the present disclosure will be described in detail with reference to the accompanying drawings.

Figure 3:
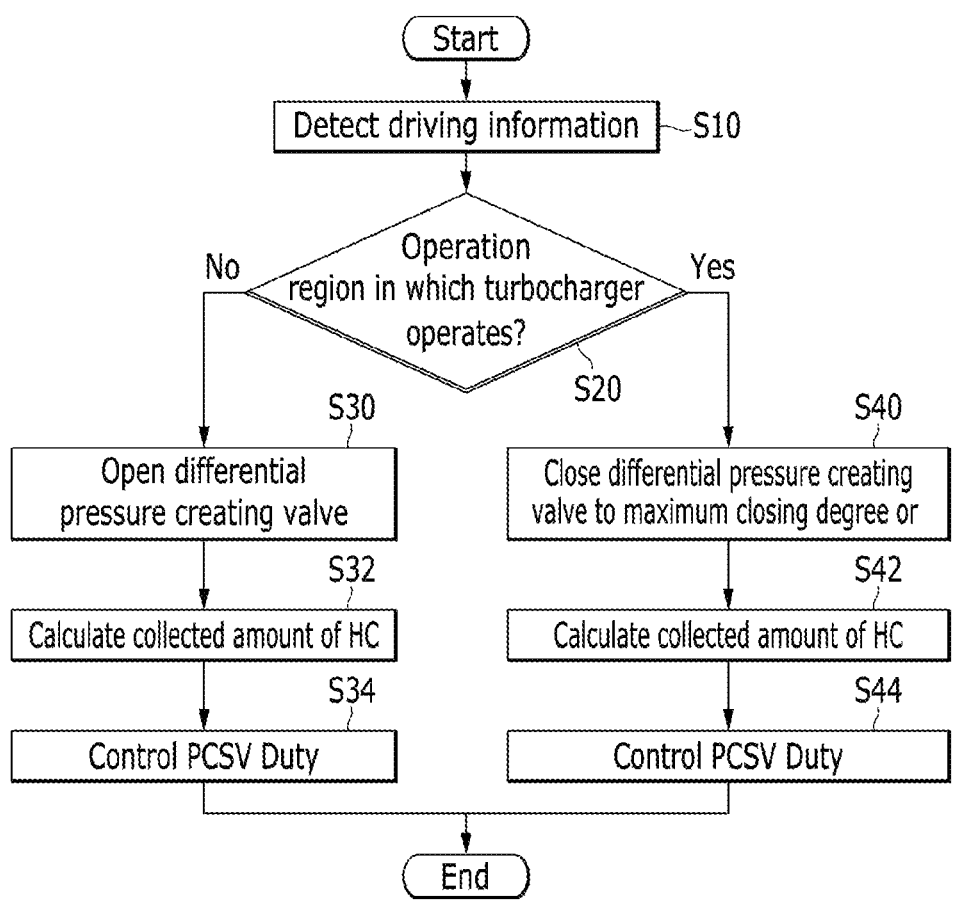
FIG. 3 is a flowchart illustrating a method of controlling the apparatus for purging fuel vapor according to the exemplary embodiment of the present disclosure.

FIG. 3 is a flowchart illustrating a method of controlling the apparatus for purging fuel vapor according to the present exemplary embodiment.

As illustrated in FIG. 3, the driving information detector 80 detects the driving information including the required torque, the required velocity, the engine speed, and the engine load (S10). The driving information detected by the driving information detector 80 is transmitted to the controller 90.

Based on the driving information, the controller 90 determines whether an operation region of the vehicle is an operation region in which the turbocharger 60 operates (S20). For example, an operation region in which the turbocharger 60 operates may be a high-speed and high-load region, and an operation region in which the turbocharger 60 does not operate may be a low-speed and low-load region.

In the case of the operation region in which the turbocharger 60 does not operate, the controller 90 opens the differential pressure creating valve 79 (S30), such that negative pressure is not formed in the intake line 10 at the upstream portion of the turbocharger 60.

The controller 90 calculates a collected amount of hydrocarbon in the canister 71 (S32). The controller 90 calculates a concentration of hydrocarbon in the canister 71 based on the amount of air to be introduced into the cylinder 21 of the engine 20 and the amount of oxygen included in the exhaust gas, and may calculate the collected amount of hydrocarbon based on the concentration of hydrocarbon. Because the method of calculating the collected amount of hydrocarbon is apparent to those skilled in the art to which the present disclosure pertains, a specific description thereof will be omitted.

The controller 90 performs duty control of the purge control solenoid valve 73 in accordance with the collected amount of hydrocarbon (S34), thereby adjusting the amount of discharged fuel vapor.

The first check valve 75 is opened by negative pressure formed in the intake manifold 23, and the fuel vapor discharged through the purge control solenoid valve 73 is supplied into the intake manifold 23 through the first check valve 75.

In step S20, when the operation region is the operation region in which the turbocharger 60 operates, the controller 90 closes the differential pressure creating valve 79 by an amount to be a maximum closing degree or less (S40), thereby forming negative pressure in the intake line 10 at the upstream portion of the compressor 64.

In this case, a magnitude of the negative pressure formed in the intake line 10 is determined by the closing degree of the differential pressure creating valve 79, and the differential pressure creating valve 79 is closed to the maximum closing degree or less. The maximum closing degree may be determined based on the required amount of intake gas of the engine and the flow velocity of the intake gas according to the opening degree of the differential pressure creating valve 79. In this case, the required amount of intake gas of the engine may be determined based on the required torque for the driver.

When the differential pressure creating valve 79 is closed to such a degree, negative pressure is formed at the upstream portion of the compressor 64, but the amount of intake gas to be supplied into the engine 20 through the intake line is decreased, and as a result, if the differential pressure creating valve 79 is excessively closed, output of the engine cannot be maintained because the intake gas is insufficient. Therefore, the closing degree of the differential pressure creating valve 79 for maintaining the output of the engine determined based on the required torque for the driver is the maximum closing degree.

In this case, the output of the engine, the closing degree of the differential pressure creating valve in accordance with the required amount of intake gas, and the maximum closing degree may be saved in the form of a map table in advance in the controller 90.

The controller 90 calculates the collected amount of hydrocarbon in the canister 71 (S42). The controller 90 calculates the concentration of hydrocarbon in the canister 71 based on the amount of air to be introduced into the cylinder 21 of the engine 20 and the amount of oxygen included in the exhaust gas, and may calculate the collected amount of hydrocarbon based on the concentration of hydrocarbon.

The controller 90 performs duty control of the purge control solenoid valve 73 in accordance with the collected amount of hydrocarbon (S44), thereby adjusting the amount of discharged fuel vapor.

In this case, the first check valve 75 is closed by negative pressure formed in the intake line 10 at the upstream portion of the compressor 64 by the differential pressure creating valve 79, and the second check valve 77 is opened, and as a result, the fuel vapor, which is discharged through the purge control solenoid valve 73, is supplied into the engine 20 through the intake line 10 at the upstream portion of the compressor 64 via the second check valve 77.

According to the exemplary embodiment of the present disclosure as described above, negative pressure is formed at the upstream portion of the compressor 64 by the differential pressure creating valve 79 installed in the intake line 10 at the upstream portion of the compressor 64, and as a result, it is possible to increase the supply amount of fuel vapor in the operation region in which the turbocharger 60 operates.

In contrast, in the operation region in which the turbocharger does not operate, it is possible to increase the amount of recirculation gas and improve control stability of the recirculation ratio (EGR ratio) by increasing differential pressure at the front and downstream portions of the recirculation valve 54 by controlling and closing the differential pressure creating valve 79. In the operation region in which the turbocharger does not operate, the fuel vapor is supplied into the intake manifold 23 through the first check valve 75, but the fuel vapor is not supplied into the intake line 10 at the upstream portion of the turbocharger 60. In this case, it is possible to increase the amount of recirculation gas by controlling and closing the differential pressure creating valve 79 (e.g., in a case in which it is necessary to increase the EGR ratio). That is, in the operation region in which the turbocharger does not operate, the differential pressure creating valve 79 may be selectively controlled.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of purging fuel vapor using an apparatus for purging fuel vapor, which includes an engine, a turbocharger, and an exhaust gas recirculation system, the method comprising steps of:
   determining, by a controller, whether the turbocharger is operating;
   adjusting, by the controller, an opening degree of a differential pressure creating valve installed in an intake line at an upstream portion of a compressor of the turbocharger based on whether the turbocharger is operating;
   calculating, by the controller, a collected amount of hydrocarbon in a canister that collects fuel vapor generated in a fuel tank after adjusting the opening degree of the differential pressure creating valve; and
   controlling, by the controller, a purge control solenoid valve based on the collected amount of hydrocarbon.

2. The method of claim 1, wherein:
   after the step of adjusting, if the turbocharger is not operating, the differential pressure creating valve is opened.

3. The method of claim 1, wherein:
   the step of adjusting the opening degree of the differential pressure creating valve includes closing the differential pressure creating, valve by a predetermined amount when the turbocharger is operating.

4. The method of claim 3, wherein:
   the differential pressure creating valve is closed to a maximum closing degree.

5. The method of claim 4, wherein:
   the maximum closing degree is a closing degree of the differential pressure creating valve for maintaining output of the engine which is determined based on a required torque for a driver.

* * * * *